Jan. 19, 1943. I. DE VRY ET AL 2,308,648
LOADING AND UNLOADING MECHANISM FOR TRUCKS
Filed March 5, 1942 2 Sheets-Sheet 1

INVENTORS
IRVING DE VRY AND
WILLIAM P. AGUIRRE
BY
ATTORNEYS

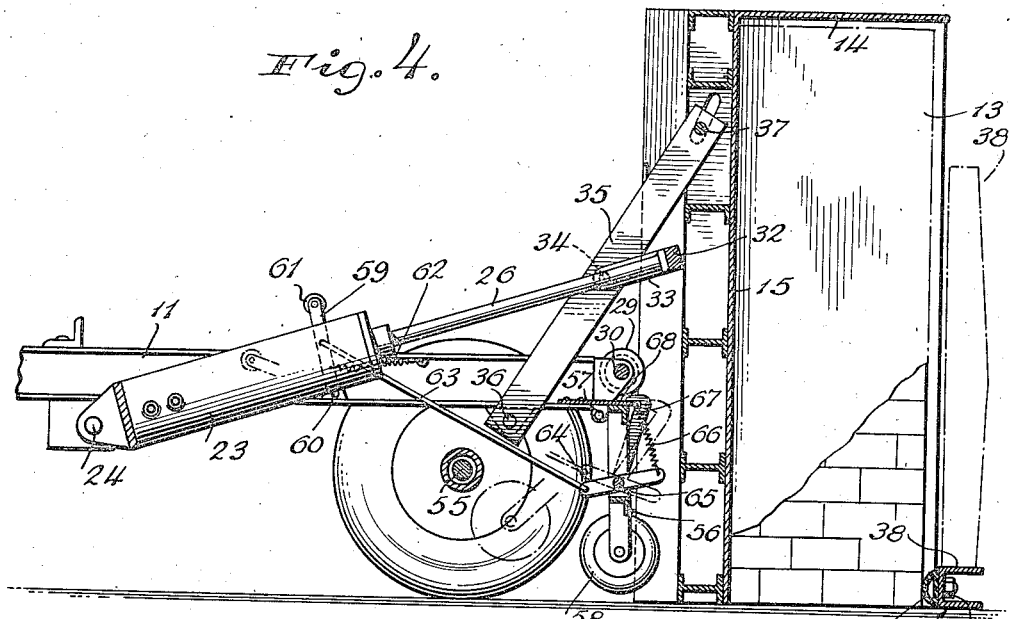

Patented Jan. 19, 1943

2,308,648

UNITED STATES PATENT OFFICE 2,308,648

LOADING AND UNLOADING MECHANISM FOR TRUCKS

Irving De Vry and William P. Aguirre, Tucson, Ariz.

Application March 5, 1942, Serial No. 433,406

21 Claims. (Cl. 214—65.2)

This invention relates to improvements in loading and unloading mechanisms and has particular reference to a mechanism especially adapted for use on automotive vehicles.

An object of the invention is to provide an improved loading and unloading mechanism of simple and practical construction wherein the body of the vehicle is capable of being adjusted to a loading position in which a stacked load resting upon the ground or other surface will be located between the side walls of the vehicle and retained within the confines of said body by clamping mechanism while the body is being adjusted from the loading position to the carrying position thereon on the chassis of the vehicle.

Another object is to avoid excessive strain upon the chassis and rear axle of the vehicle while the body is being moved between its load-carrying and loading or unloading positions, by the provision of a dolly which is adjustable to a supporting position relative to the chassis.

A further object is to provide an operating mechanism for the supporting dolly which is controlled by the movement of the body away from its load-carrying position, to adjust said dolly from an inoperative position to one in which the same will support the chassis and relieve excessive strain thereon, especially when the center of gravity of the load is rearwardly of or over the rear axle of the vehicle during the movement of said body between its two positions.

The above and other objects will appear more clearly from the following detailed description when taken in connection with the accompanying drawings, which illustrate a preferred embodiment of the inventive idea.

In the drawings:

Fig. 4 is an enlarged vertical longitudinal section, substantially on the line 4—4 of Fig. 5, of the loading or unloading mechanism, with the body in its loading or unloading position.

Fig. 5 is a top plan view of said mechanism, and

Fig. 6 is an enlarged elevation of one of the units of the load clamping mechanism, which units are positioned on the sides of the vehicle body adjacent the rear open end thereof.

The mechanism of the present invention is particularly adapted for loading and unloading material capable of being stacked, such as brick, tile, cut stone, packaged material and the like; but it will be understood that the invention is not limited to such use, reference being had to the appended claims for a definition of the limitations of the invention.

Figure 1:
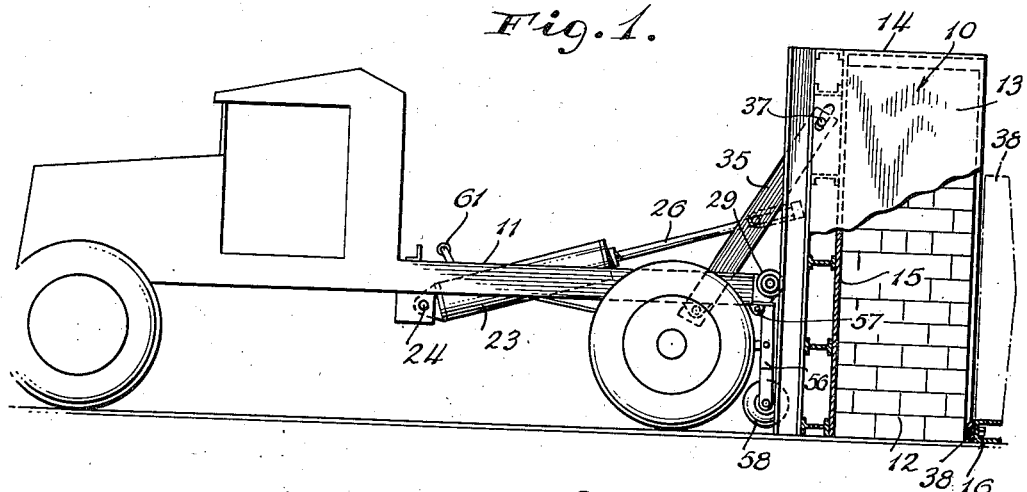
Fig. 1 is a side elevation of the loading and unloading mechanism applied to a motor vehicle and showing the body of the vehicle in its loading or unloading position, said body being partly broken away and shown in section.
Figure 2:
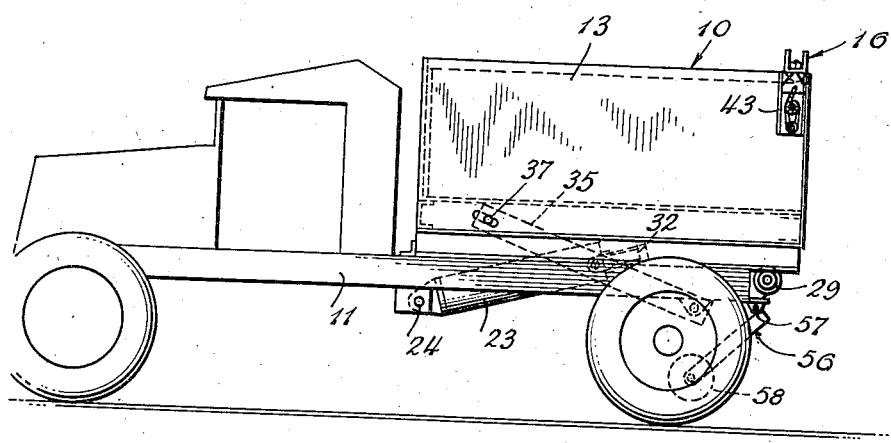
Fig. 2 is a side elevation illustrating the body and associated parts in the load-carrying position.

Briefly, the body 10 is supported in its load-carrying position upon the chassis 11 of a motor vehicle, as shown in Fig. 2, and when depositing material from the body or loading the same, said body is adjusted to a substantially vertical position, as illustrated in Figs. 1 and 4. In so doing, the vehicle is backed up to a stacked pile of material 12 and the body then adjusted to the vertical position, with said pile disposed between the side walls 13, and engaged by the front end wall 14 and bottom 15. The open rear end of the body then rests upon the ground and a load clamping mechanism generally indicated by the numeral 16, carried by the rear end of the body and which replaces the usual tail gate, is then adjusted against the then outer or exposed vertical face of the load 12 at its bottom and tightly clamped thereagainst to securely retain the load within the confines of the body 10 as the latter is returned to its carrying position. Said clamping mechanism may then be left in its operative position to prevent dislodgment of the load during transportation, and when the load is deposited at its destination the mechanism retains said load intact during the adjustment of the body 10 to the vertical or unloading position, after which the mechanism is released and the vehicle pulled away from the stacked load.

Figure 3:
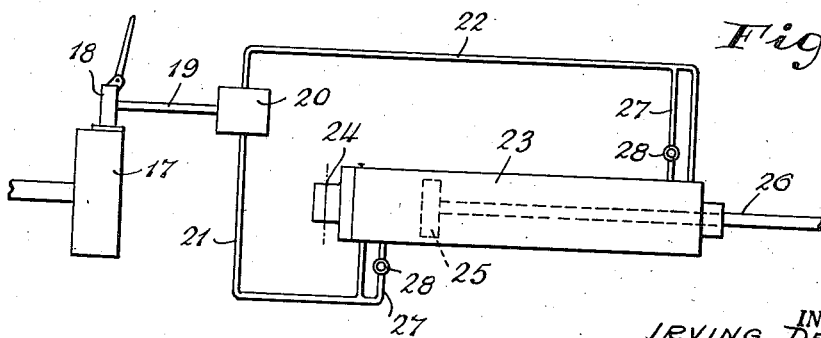
Fig. 3 is a diagrammatic view of a hydraulically operated mechanism for controlling the adjustment of the vehicle body to its load-carrying and loading or unloading positions.

The movements of the body 10 to and from its two positions are accomplished by a hydraulically operated mechanism of more or less standard construction which is controlled from the power plant of the motor vehicle. This mechanism is best illustrated in Fig. 3 in which several standard units of the mechanism are conventionally shown. Thus, the transmission of the vehicle is indicated at 17 and coupled thereto is a reversible power take-off 18 utilized to rotate a drive shaft 19 in different directions. This shaft operates a two-way oil pump 20 which creates a flow of oil in two different directions in a closed circuit including the pipe lines 21 and 22 extending from the pump 20 to the forward and rear ends, respectively, of the cylinder 23. Said cylinder is pivotally mounted, at 24, on the chassis 11 for vertical movement relative thereto and contained within the cylinder is the piston 25, the rod 26 of which extends through the rear end of the cylinder for connection to a mechanism, presently to be described, for moving the body 10 between its two positions. The two lines 21 and 22 have branches 27 communicating with the interior of the cylinder 23 at opposite ends thereof and the flow of oil in these branches is controlled by check valves 28 located therein. When the piston 25 is at the forward end of the cylinder, the body 10 is in its load-carrying position, and upon adjustment of the take-off 18 to drive the pump 20 in a direction which will force the oil through the pipe 21 into the forward end of the cylinder, the piston 25 will be driven rearwardly to effect the movement of the body 10 from its load-carrying to its loading or unloading position. To restore said body to the load-carrying position, the take-off 18 is adjusted to reverse the direction of drive of the pump 20 and the piston 25 will then be forced forwardly by the pressure of oil from the pump 20 through the line 22 into the rear end of the cylinder 23.

In its movements between the two positions of the body, the same is supported by flanged ball bearing rollers 29 mounted on an axle 30 extending across the rear end of the chassis frame 11 and engaged by I-beams 31 forming a part of the undercarriage of the body. The means designed to move said body to its adjusted positions and which is under the control of the hydraulic mechanism above described, comprises a cross beam 32 rigidly connected intermediate its ends to the rear end of the piston rod 26. The ends of said beam are provided with forwardly projecting extensions 33 and each of these extensions carries a pin 34 that projects into an opening formed in an operating arm 35 at an intermediate point thereof. One end of each arm 35 is fulcrummed at 36 to the chassis 11 for pivotal movement relative thereto during adjustment of the body 10, and the opposite end of said arm has a pin and slot connection 37 with the undercarriage of the body 10 adjacent the forward end thereof. This pin and slot connection is provided so that when the body 10 is in its vertical loading or unloading position the play afforded between the body and the arms 35 permits said body to adjust itself to the ground level. With the arrangement just described, when the piston 25 is moved rearwardly to adjust the body 10 from the load-carrying position of Fig. 2 to that shown in Figs. 1 and 4, the cross beam 32 is forced rearwardly and upwardly and, in so doing, the arms 35 will swing in a similar direction about their pivots 36 with the result that the forward end of the body will be raised and at the same time forced rearwardly over the rollers 29. Continued movement of said arms 35 will finally bring the body 10 into its vertical position wherein, if a loading operation is taking place, the load 12 will be positioned within the confines of said body. From the foregoing description it will be obvious that by reversing the direction of movement of the piston 25 the apparatus will operate to restore the body 10 to its load-carrying position upon the chassis.

After the body 10 has been adjusted to its loading position, with the load 12 located within said body, the clamping mechanism 16 is adjusted to securely grip the base of the load 12 preparatory to the restoration of the body 10 to its load-carrying position. Proper adjustment of this clamping mechanism to its operative position will cause the same to grip the load with such force that as the latter is raised off of the ground by the movement of the body 10 toward its load-carrying position, the portions of the stacked load which form the base thereof will be prevented from accidental dislodgment so that when the body 10 is finally located above and in position on the chassis 11 said load will remain intact until it is unloaded at its point of destination by an adjustment of the body 10 to the unloading position and a release of the clamping mechanism 16. Said mechanism comprises a channelled tail piece 38 adapted to extend across the edges of the side walls 13 of the body 10 at the rear end of the latter, and the inner face of the tail piece 38 carries a resilient gripping element 39 which may be in the form of a rubber tube adapted for engagement with the material at the base of the load 12 so as to more securely grip the same when the mechanism 16 is adjusted to clamping position. At each end of the tail piece 38 the same is connected to a block 40 provided with a rearwardly projecting bolt 41 for receiving the removable nut 42 which clamps the tail piece 38 to the block. When adjusting the body 10 to its loading position, one end of the tail piece 38 is disconnected from its block 40 by removal of the nut 42 and the tail piece may then be swung to vertical dotted line position in Fig. 4 so that the body 10 may be backed into surrounding relation with respect to the load 12. After this has been accomplished the tail piece 38 is restored to its horizontal or operative position and is then clamped tightly against the load by the gearing illustrated in Fig. 6. Said gearing consists of two units each located within a housing 43 secured to the outer face of one of the side walls 13 at the rear end thereof, and the flanges 44 of each housing act as a guide for the associated block 40 as the tail piece 38 is being clamped in position. The two gearing units are identical in construction and therefore a description of one will suffice. A stub shaft 45 in the housing 43 supports a drum 46 to which is connected one end of a chain 47 the other end of which is joined to the block 40. The shaft 45 also carries a sprocket 48 about which extends the endless drive element 49 which also extends about a smaller sprocket 50 mounted within the housing and adapted to receive a crank handle 51 by means of which the sprocket may be turned in either direction to rotate the drum to tighten or slacken the chain 47. A pawl 52 is pivoted in the housing 43 and engaged with the sprocket 48 so as to prevent rotation thereof in a clockwise direction, as viewed in Fig. 6, when the tail piece is being tightened against the load. A spring 53 connected to the handle 54 of the pawl 52 yieldably holds said pawl in its locking position and the handle 54, which extends upwardly of the housing 43, is utilized to release said pawl 52 from its engagement with the sprocket 48 when it is desired to release the tail piece 38.

When the body 10 is loaded and in its carrying position on the chassis 11, the load is so distributed that no excessive strain will be placed upon any particular portion of the chassis or the understructure of the vehicle, including its rear axle 55. However, during a certain phase of the movement of the body from the loading position toward the carrying position, or vice versa, the center of gravity of the load will be over the rear axle and the rear portion of the chassis, and when in this position there may be an excessive strain upon parts of the vehicle. In order to avoid such strain there is provided a dolly generally indicated by the numeral 56 which it pivoted at 57 to the chassis and which moves from a raised inoperative position (Fig. 2) to a vertical operative position (Figs. 1 and 4) when the body 10 is moved from its load-carrying position toward its loading position. The movements of the dolly to its operative position and its restoration to the inoperative position thereof are controlled, respectively, by the initial movement of the body 10 from the load-carrying position and its final movement when being restored to said position. The dolly 56 comprises a frame work in the lower end of which are journalled a pair of wheels 58, which, when the dolly is in its operative position and no excessive strain is applied to the rear end of the chassis, are elevated above the ground, but which will contact the ground and thus support the chassis against excessive strain when the center of gravity of the load is located above the rear end of the chassis. The means for adjusting the dolly to its operative and inoperative positions comprises a lever 59 pivotally connected at 60 to the chassis 11 and carrying a roller 61 at its free end adapted to be contacted by a part of the undercarriage of the body 10 to depress said lever to the dotted line position of Fig. 4 when said body is in its load-carrying position. However, upon initial movement of the body from the latter position a spring 62 connected to the lever 59 will raise the same to the full line position of Figs. 1 and 4 and this movement will be transmitted, through a rod 63 joining the lever 59 with a pivot arm 64, to the dolly frame 56 to swing the same about its pivot 57 from its inoperative position to the operative position thereof. The arm 64 is fixed, intermediate its ends, to a rod 65 rockingly mounted in the vertical side members of the frame 56. The end of the arm 64 opposite that to which the arm 63 is connected has joined thereto one end of a coil spring 66 the other end of which is affixed to a permanent part of the chassis 11. When the dolly is in its inoperative position the spring 66 is expanded and tensioned and when said dolly is moved to the operative position said spring contracts to rock the arm 64 and thus turn the rod 65. This turning of said rod is utilized to move a pair of latching members 67 secured to the rod 65 adjacent the ends thereof, from their inoperative positions, shown in dotted lines, to the operative positions thereof in which the free extremities of said latches engage over the rear edge of a plate 68 carried by the chassis. When in this position, the latching members act to retain the dolly in its operative position and prevent any accidental movement thereof toward its inoperative position when the wheels 58 of the dolly are out of contact with the ground. The arrangement of the operating means for the dolly is such that the latter will reach its operative position before the center of gravity of the body and its load is directly over the rear end of the chassis, and said dolly will remain in its operative position to support the chassis against excessive strain until the body is again restored to its load-carrying position in the manner previously described. During the final stages of said return movement the undercarriage of the body will contact the roller 61 and force the lever 59 downwardly and as this occurs, a forward pull will be exerted upon the rod 63 to initially rock the arm 64 and thus, through the rod 65, swing the latch members 67 out of engagement with the plate 68 to release the dolly for its return movement to the inoperative position thereof as further pull is exerted upon the rod.

What is claimed is:

1. A vehicle loading and unloading mechanism comprising, in combination, a body having side walls and movable from a horizontal load-carrying position on the chassis of a vehicle to a loading position in which said body is vertically disposed to receive a stacked load between the side walls thereof and then returned to said carrying position, body moving means including arms pivotally connecting said body with said chassis, a cross member having pivotal connection with said arms intermediate their ends, operating means connected to said cross member to actuate the same to swing said arms about their pivots to move said body toward either of its positions, a load clamping mechanism comprising a tail piece pivotally connected to one of said side walls and movable from a position alongside said wall to an extended position across the rear open end of said body and to the other side wall thereof so as to engage with the base of said stacked load when it is positioned between said side walls, and gearing carried by said walls and connected to said tail piece to draw the latter tightly against said load to retain the same between said walls as the body is being moved from loading to carrying position.

2. A vehicle loading and unloading mechanism comprising, in combination, a body having side walls and movable from a horizontal load-carrying position on the chassis of a vehicle to a loading position in which said body is vertically disposed to receive a stacked load between the side walls thereof and then returned to said carrying position, body moving means including arms pivotally connecting said body with said chassis, a cross member having pivotal connection with said arms intermediate their ends, operating means connected to said cross member to actuate the same to swing said arms about their pivots to move said body toward either of its positions, a load clamping mechanism comprising a tail piece pivotally connected to one of said side walls and movable from a position alongside said wall to an extended position across the rear open end of said body and to the other side wall thereof so as to engage with the base of said stacked load when it is positioned between said side walls, gearing carried by said walls and connected to said tail piece to draw the latter tightly against said load to retain the same between said walls as the body is being moved from loading to carrying position, and a dolly suspended from said chassis and movable to a chassis supporting position during the movement of said body from its loading to the carrying position thereof.

3. A vehicle loading and unloading mechanism comprising, in combination, a body movable from a horizontal load-carrying position on the chassis of a vehicle to a loading position in which said body is vertically disposed to receive a stacked load between the side walls thereof and then returned to said carrying position, means to so move said body, a load clamping mechanism extending across the rear open end of said body and including a tail piece engageable with the base of said stacked load when the latter is positioned between said side walls, winding mechanism carried by said side walls and including drums, flexible elements windable on said drums and joined to said tail piece, and means to wind said elements on to said drums to tighten said gripping element against said load to retain the same within the confines of said body as the latter is being moved from one position to another.

4. A vehicle loading and unloading mechanism comprising in combination, a body movable from a horizontal load-carrying position on the chassis of a vehicle to a loading position in which said body is vertically disposed to receive a stacked load between the side walls thereof and then returned to said carrying position, means to so move said body, a load clamping mechanism extending across the rear open end of said body and including a tail piece engageable with the base of said stacked load when the latter is positioned between said side walls, winding mechanism carried by said side walls and including drums, flexible elements windable on said drums and joined to said tail piece, means to wind said elements on to said drums to tighten said gripping element against said load to retain the same within the confines of said body as the latter is being moved from one position to another, and a dolly suspended from said chassis and movable to a chassis supporting position during the movement of said body from its loading to the carrying position thereof.

5. A vehicle loading and unloading mechanism comprising, in combination, a body including side walls and movable from a horizontal load-carrying position on the chassis of a vehicle to a loading position in which said body is vertically disposed to receive a stacked load between the side walls thereof and then returned to said carrying position, bearings for said body about which the same moves from one position to another, body moving means including arms pivotally connecting said body with said chassis, a cross member having pivotal connection with said arms intermediate their ends, operating means connected to said cross member to actuate the same to swing said arms about their pivots to move said body toward either of its positions, a load clamping mechanism extending across the rear open end of said body and including a tail piece pivotally connected to one of said side walls and movable from a position alongside said wall to an extended position across the rear open end of said body so as to be engageable with the base of said stacked load when the latter is positioned between said side walls, winding mechanism carried by said side walls and including drums, flexible elements windable on said drums and joined to said tail piece, and means to wind said elements on to said drums to tighten said gripping element against said load to retain the same within the confines of said body as the latter is being moved from one position to another.

6. A vehicle loading and unloading mechanism comprising, in combination, a body movable from a horizontal load-carrying position on the chassis of a vehicle to a loading position in which said body is vertically disposed to receive a stacked load between the side walls thereof and then returned to said carrying position, bearings for said body about which the same moves from one position to another, body moving means including levers pivotally connecting said body with said chassis, means to swing said levers about their pivots to move said body toward either of its positions, a load clamping mechanism including a tailpiece extending across the rear open end of said body and having a resilient gripping element engageable with the base of said stacked load when the latter is positioned between said side walls, winding mechanism carried by said side walls and including drums, flexible elements windable on said drums and joined to said tail piece, means to wind said elements on to said drums to tighten said gripping element against said load to retain the same within the confines of said body as the latter is being moved from one position to another, and a dolly suspended from said chassis and movable to a chassis supporting position during the movement of said body from its loading to the carrying position thereof.

7. A vehicle loading and unloading mechanism comprising, in combination, a body movable to and from a load-carrying position and a loading and unloading position, means to so move said body, a dolly pivotally suspended from the chassis of the vehicle and having pivotal movements to and from operative and inoperative positions, and means controlled by the movement of said body from its load-carrying position to swing said dolly from its inoperative to its operative position.

8. A vehicle loading and unloading mechanism comprising, in combination, a body movable to and from a load-carrying position and a loading and unloading position, means to so move said body, a dolly suspended from the chassis of the vehicle and having operative and inoperative positions, and means controlled by the movement of said body from its carrying position to adjust said dolly to its operative position.

9. A vehicle loading and unloading mechanism comprising, in combination, a body movable to and from a load-carrying position and a loading and unloading position, means to so move said body, a dolly suspended from the chassis of the vehicle and having movements to and from operative and inoperative positions, means controlled by the movement of said body from its carrying position to adjust said dolly to its operative position, and a latch actuated by the last named means to engage said chassis to releasably retain said dolly in position.

10. A vehicle loading and unloading mechanism comprising, in combination, a body movable from a horizontal load-carrying position on the chassis of a vehcile to a loading position in which said body is vertically disposed to receive a stacked load between the side walls thereof and then returned to said carrying position, means to so move said body, a load clamping mechanism operable when the body is vertically disposed to retain said load within the confines of said body as the latter is being returned to said carrying position, a dolly movable to support said chassis during adjustments of said body to and from said carrying position, and means controlled by the initial movement of said body from said carrying position to move said dolly to its supporting position.

11. A vehicle loading and unloading mechanism comprising, in combination, a body removable from a horizontal load-carrying position on the chassis of a vehicle to a loading position in which said body is vertically disposed to receive a stacked load between the side walls thereof and then returned to said carrying position, bearings for said body about which the same moves from one position to another, body moving means including arms pivotally connecting the forward end of said body with the rear end of said chassis, a cross member having pivotal connection with said arms intermediate their ends, operating means connected to said cross member to actuate the same to swing said arms about their pivots to move said body toward either of its positions, a load clamping mechanism operable when the body is vertically disposed to retain said load within the confines of said body as the latter is being returned to said carrying position, a dolly movable to support said chassis during adjustments of said body to and from said carrying position, and means controlled by the initial movement of said body from said carrying position to move said dolly to its supporting position.

12. A vehicle loading and unloading mechanism comprising, in combination, a body movable from a horizontal load-carrying position on the chassis of a vehicle to a loading position in which said body is vertically disposed to receive a stacked load between the side walls thereof and then returned to said carrying position, means to so move said body, a load clamping mechanism comprising a tail piece extending across the rear open end of said body and engageable with the base of said stacked load when it is positioned between said side walls, gearing carried by said walls and connected to said tail piece to draw the latter tightly against said load to retain the same between said walls as the body is being moved from loading to carrying position, a dolly movable to support said chassis during adjustments of said body to and from said carrying position, and means controlled by the initial movement of said body from said carrying position to move said dolly to its supporting position.

13. A vehicle loading and unloading mechanism comprising, in combination, a body movable from a horizontal load-carrying position on the chassis of a vehicle to a loading position in which said body is vertically disposed to receive a stacked load between the side walls thereof and then returned to said carrying position, means to so move said body, a load clamping mechanism extending across the rear open end of said body and having a resilient gripping element engageable with the base of said stacked load when the latter is positioned between said side walls, winding mechanism carried by said side walls and including drums, flexible elements windable on said drums and joined to said tail piece, means to wind said elements on to said drums to tighten said gripping element against said load to retain the same within the confines of said body as the latter is being moved from one position to another, a dolly movable to support said chassis during adjustments of said body to and from said carrying position, and means controlled by the initial movement of said body from said carrying position to move said dolly to its supporting position.

14. A vehicle loading and unloading mechanism comprising, in combination, a body movable from a horizontal load-carrying position on the chassis of a vehicle to a loading position in which said body is vertically disposed to receive a stacked load between the side walls thereof and then returned to said carrying position, bearings for said body about which the same moves from one position to another, body moving means including levers pivotally connecting said body with said chassis, means to swing said levers about their pivots to move said body toward either of its positions, a load clamping mechanism extending across the rear open end of said body and having a resilient gripping element engageable with the base of said stacked load when the latter is positioned between said side walls, winding mechanism carried by said side walls and including drums, flexible elements windable on said drums and joined to said tail piece, means to wind said elements on to said drums to tighten said gripping element against said load to retain the same within the confines of said body as the latter is being moved from one position to another, a dolly movable to support said chassis during adjustments of said body to and from said carrying position, and means controlled by the initial movement of said body from said carrying position to move said dolly to its supporting position.

15. A vehicle loading and unloading mechanism comprising, in combination, a body movable on a vehicle chassis to and from load-carrying and loading or unloading positions, means to so move said body, a load clamping mechanism engageable with a load in said body while the latter is being moved, gearing carried by said body and connected to said clamping mechanism to tighten the latter against said load, a dolly movable to support said chassis during movements of said body, and means controlled by a movement of said body from said carrying position to move said dolly to its supporting position.

16. A vehicle loading and unloading mechanism comprising, in combination, a body movable to and from a load-carrying position and a loading or unloading position, means to so move said body, a dolly supported by the chassis of the vehicle and having operative and inoperative positions, and means controlled by the initial movement of said body from said carrying position to adjust said dolly to its operative position, the last-named means being further controlled by the final movement of said body from its loading or unloading position to adjust said dolly to its inoperative position.

17. A vehicle loading and unloading mechanism comprising, in combination, a body movable to and from a load-carrying position and a loading or unloading position, means to so move said body, a dolly movably supported by the chassis of the vehicle and having operative and inoperative positions relative thereto, and means contacted by said body when in its carrying position and actuated upon the movement of the body out of contact therewith to adjust said dolly to its operative position.

18. A vehicle loading and unloading mechanism comprising, in combination, a body movable to and from a load-carrying position and a loading or unloading position, means to so move said body, a dolly movably supported by the chassis of the vehicle and having operative and inoperative positions relative thereto, means contacted by said body when in its carrying position and actuated upon the movement of the body out of contact therewith to adjust said dolly to its operative position, and a latch controlled by actuation of the last-named means to engage said chassis to releasably retain said dolly in its operative position.

19. A vehicle loading and unloading mechanism comprising, in combination, a body movable to and from a load-carrying position and a loading or unloading position, means to so move said body, a dolly movably supported by the chassis of the vehicle and having operative and inoperative positions relative thereto, and a dolly operating mechanism operable upon contact of said body with a portion thereof and upon disengagement of said body from said portion to adjust said dolly to inoperative and operative positions, respectively.

20. A vehicle loading and unloading mechanism comprising, in combination, a body movable to and from a load-carrying position and a loading or unloading position, means to so move said body, a dolly movably supported by the chassis of the vehicle and having operative and inoperative positions relative thereto, a lever pivoted to said chassis and depressed by contact of said body therewith when the latter is in its carrying position, means to raise said lever when said body moves out of contact therewith, and means connecting said lever with said dolly to adjust the latter when said lever is moved to either of its positions.

21. A vehicle loading and unloading mechanism comprising, in combination, a body movable to and from a load-carrying position and a loading and unloading position, means to so move said body, a dolly suspended from the chassis of the vehicle and having operative and inoperative positions, and operating means for said dolly including an element engaged by said body when in its load-carrying position to maintain said dolly in its inoperative position, and means operable upon movement of said body out of engagement with said element to actuate said operating means so as to adjust said dolly to its operative position.

IRVING DE VRY.
WILLIAM P. AGUIRRE.